United States Patent [19]
Nakane

[11] Patent Number: 5,285,432
[45] Date of Patent: Feb. 8, 1994

[54] TRACK JUMP CONTROL CIRCUIT
[75] Inventor: Hiroshi Nakane, Kanagawa, Japan
[73] Assignee: Kabushiki Kaisha Toshiba, Kawasaki, Japan
[21] Appl. No.: 899,053
[22] Filed: Jun. 16, 1992

Related U.S. Application Data
[63] Continuation of Ser. No. 604,466, Oct. 29, 1990, abandoned.

[30] Foreign Application Priority Data
Oct. 31, 1989 [JP] Japan ................. 1-285912

[51] Int. Cl.$^5$ ............................. G11B 21/10
[52] U.S. Cl. ........................... 369/33; 369/32; 369/44.25; 369/44.28; 369/239
[58] Field of Search ............. 369/32, 33, 44.25, 44.28, 369/239, 240, 241; 360/78.08, 78.14

[56] References Cited
U.S. PATENT DOCUMENTS

| | | | |
|---|---|---|---|
| 4,236,232 | 11/1980 | Jansen et al. | 369/33 |
| 4,268,745 | 5/1981 | Okano | 369/44.25 |
| 4,513,406 | 4/1985 | Ishihara | 369/44.28 |
| 4,730,298 | 3/1988 | Takahashi | 369/44.28 |
| 4,731,771 | 3/1988 | Maeda et al. | 369/44.25 |
| 4,748,607 | 5/1988 | Nakane | 369/44.28 |
| 4,796,247 | 1/1989 | Vogelsang | 369/44.28 |
| 4,839,876 | 6/1989 | Fennema | 369/44.28 |
| 4,896,310 | 1/1990 | Wachi | 369/44.25 |
| 4,937,803 | 6/1990 | Nakane | 369/32 |
| 4,955,016 | 9/1990 | Nabeshima et al. | 369/32 |

FOREIGN PATENT DOCUMENTS
0312410 4/1989 European Pat. Off.
0361381 4/1990 European Pat. Off.
3626029 2/1987 Fed. Rep. of Germany.

Primary Examiner—Eugene R. LaRoche
Assistant Examiner—Tan Nguyen
Attorney, Agent, or Firm—Oblon, Spivak, McClelland, Maier & Neustadt

[57] ABSTRACT

A track jump control circuit having a pick-up for reading information stored on a disc, a motor for moving the pick-up in a radial direction of the disc, a speed detector for detecting the moving speed of the pick-up and for outputting a speed signal, an integration circuit for generating a signal according to the moving amount of the pick-up according to the speed signal being detected, a reference voltage generation circuit for generating a reference signal according to the distance for which the pick-up is moved in a track jump mode, a comparator for comparing the reference signal with the signal according to the moving amount and for sending a difference signal to the motor, and a controller for stopping sending the difference signal to the motor when the difference signal is in a predetermined range. When the difference signal between the reference signal and the signal according to the moving amount is in the predetermined range, the completion of the track jump operation is determined. Thus, the determination of the completion of the track jump operation is not much affected by an external vibration.

31 Claims, 5 Drawing Sheets

TRACK JUMP CONTROL CIRCUIT

This application is a continuation of application Ser. No. 07/604,466, filed on Oct. 29, 1990, now abandoned.

BACKGROUND OF THE INVENTION

1. Field of the Invention

The present invention relates to a track jump control circuit used in an optical record and playback apparatus or the like.

2. Description of the Related Art

Generally, in an optical record and playback apparatus such as a compact disc player (CD player), or compact disc ROM (CD-ROM), information stored on a disc is read by a pick-up.

In such an optical record and playback apparatus, when reading information by means of the pick-up, the pick-up is moved at a low speed so as to follow tracks. When placing the pick-up to a desired position, the pick-up is moved at a high speed so as to jump tracks.

A track jump control circuit for conducting such a track jump operation is disclosed in Japanese Patent Application Serial No. SHO 60-117203.

With the track jump control circuit, in the track jump state, the moving speed of the pick-up is detected. The completion of the track jump operation is determined by the moving speed.

However, with the aforementioned track jump control circuit, if a vibration is applied to the optical record and playback apparatus, the vibration component is added to the speed signal of the pick-up. Thus, the completion of the track jump cannot be precisely determined.

In addition, the speed signal of the pick-up is obtained only after the pick-up is moved. Thus, the response of the early stage of the track jump is slow.

SUMMARY OF THE INVENTION

An object of the present invention is to solve such problems and to provide a track jump control circuit for determining the completion of the track jump operation.

To accomplish such an object, the first embodiment of the present invention is a track jump control circuit comprising a pick-up for reading information stored on a disc, moving means for moving the pick-up in a radial direction of the disc, speed detecting means for detecting the moving speed of the pick-up and for outputting a speed signal, moving amount computing means for generating a signal according to the moving amount of the pick-up according to the speed signal, means for generating a reference signal according to a distance for which the pick-up is moved in a track jump mode, comparing means for comparing the reference signal with a signal according to the moving amount and for sending a difference signal to the moving means, and stopping means for stopping sending the difference signal to the moving means when the difference signal is in a predetermined range.

To accomplish such an object, the second embodiment of the present invention is a track jump control circuit comprising a pick-up for reading information stored on a disc, moving means for moving the pick-up in a radial direction of the disc, speed detecting means for detecting the moving speed of the pick-up and for outputting a speed signal, moving amount computing means for generating a signal according to the moving amount of the pick-up, means for generating a reference signal according to a distance for which the pick-up is moved in a track jump mode, comparing means for comparing the reference signal with a signal according to the moving amount and for sending a difference signal to the moving means, and addition means for adding the difference signal and the speed signal, and stopping means for stopping sending the difference signal to the moving means when the difference signal is in a predetermined range.

In the first embodiment, when the difference signal between the position signal of the pick-up and the reference signal is in a predetermined range, the completion of the track jump operation is determined. Since the completion of the track jump operation is determined in accordance with the position signal, even if a vibration is applied to the apparatus, the completion of the track jump can be precisely determined.

The position error signal is lesser affected by an external vibration frequency than the speed signal.

In the second embodiment, both the position signal of the pick-up and the speed signal can be controlled.

DESCRIPTION OF PREFERRED EMBODIMENTS

By referring to the accompanying drawings, embodiments of the present invention will be described in the following.

Figure 1:
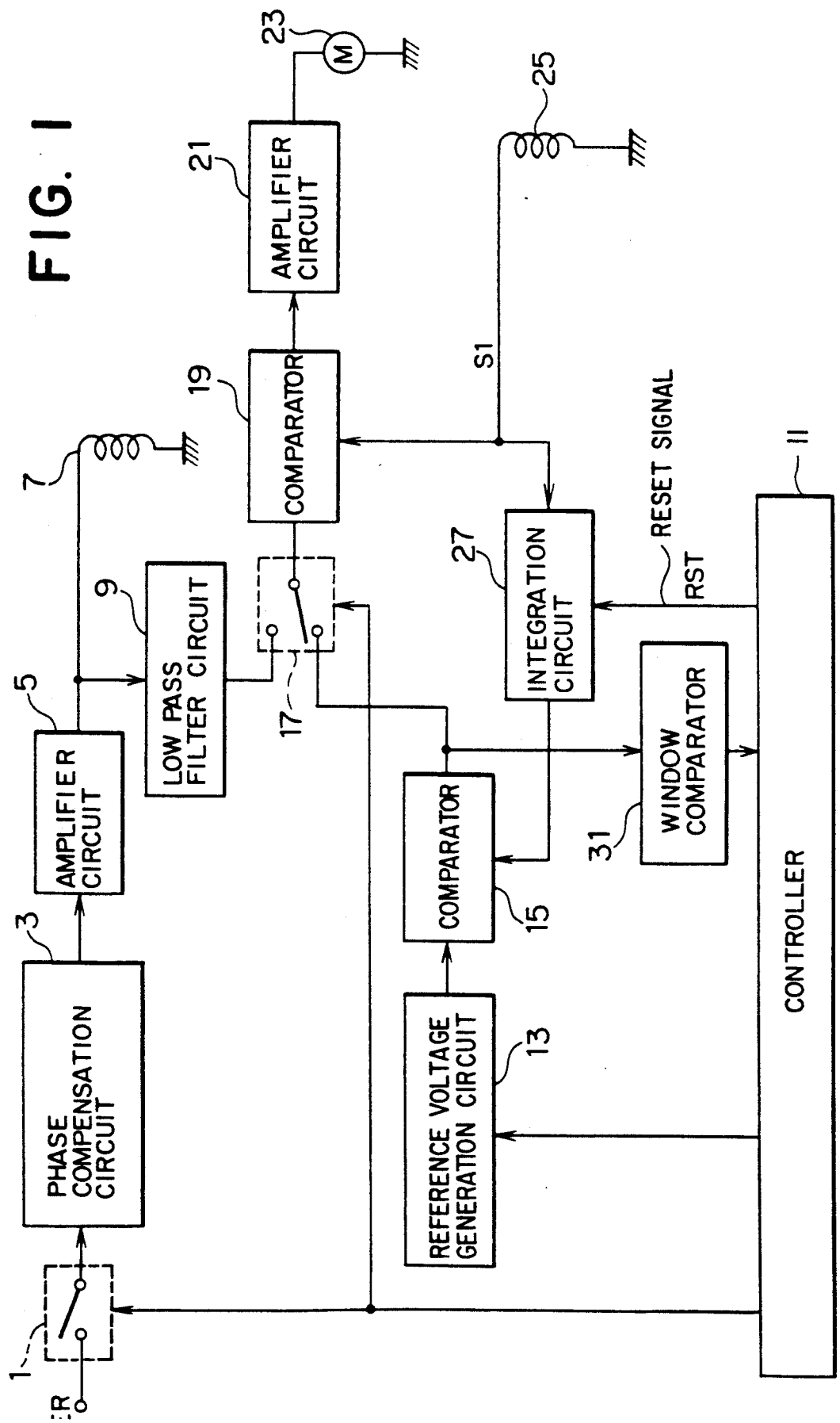
FIG. 1 is a block diagram showing the structure of a track jump control circuit of a first embodiment of the present invention.
Figure 2:
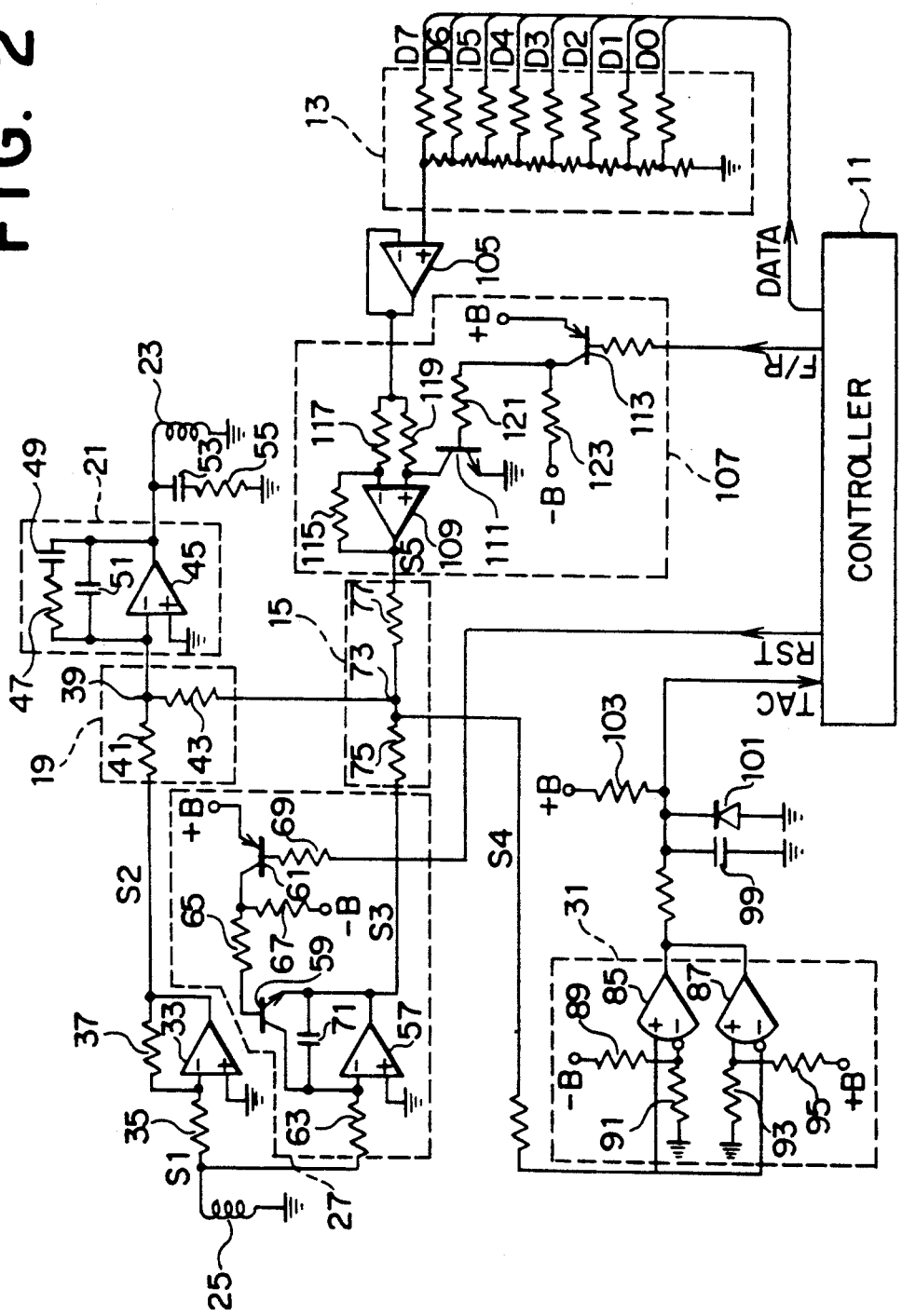
FIG. 2 is a circuit diagram of the track jump control circuit of the first embodiment of the present invention.

FIG. 1 is a block diagram showing the structure of a track jump control circuit. FIG. 2 is a circuit diagram of the track jump control circuit.

FIG. 1 includes circuits which are not illustrated in FIG. 2. In contrast, FIG. 2 includes circuits which are not illustrated in FIG. 1.

The track jump control circuit comprises a switch 1, a phase compensation circuit 3, an amplifier circuit 5, a tracking actuator 7, a low pass filter 9, a controller 11, a reference voltage generation circuit 13, a comparator 15, a switch 17, a comparator 19, a amplifier circuit 21, a motor 23 a speed detector 25, an integration circuit 27, and a window comparator 31.

The switch 1 sends a tracking error signal ER to the phase compensation circuit 3 in accordance with a command issued by the controller 11. The phase compensation circuit 3 converts the phase of the tracking error signal ER.

The amplifier circuit 5 amplifies an output signal of the phase compensation circuit 3 and sends the resultant signal to the tracking actuator 7 and the low pass filter 9 so as to form a tracking servo loop. The low pass filter 9 sends a low frequency component of an output signal of the amplifier circuit 5 to the switch 17.

The switch 1, the phase compensation circuit 3, the amplifier circuit 5, the tracking actuator 7, the low pass filter 9, and the switch 17 are omitted in FIG. 2.

The controller 11 controls the switches 1 and 17 and sends a particular signal to the reference voltage generation circuit 13 and a reset signal RST to the integration circuit 27, respectively. The reference voltage generation circuit 13 consists of a ladder resistor, which converts track jump data portions D0 to D7 which are sent from the controller 11 into an analog signal. An arithmetic amplifier 105 converts an impedance to another one.

A direction switching device 107 outputs a signal according to the direction where the pick-up is moved by means of a signal F/R which is sent from the controller 11. The direction switching device 107 consists of an arithmetic amplifier 109, transistors 111 and 113, and resistors 115, 117, 119, 121, and 123, the resistance of the resistors 115 being the same as that of the resistor 117.

When the signal F/R is set to "1", the transistor 111 is turned off. Thus, the arithmetic amplifier 109 functions as a non-inverting amplifier whose gain is "1". In contrast, when the signal F/R is set to "0", the transistor 111 is turned on. Thus, the arithmetic amplifier 109 functions as an inverting amplifier whose gain is "−1". In other words, when the signal F/R is set to "1", the direction switching device 107 outputs an output of the arithmetic amplifier 105 as it is. When the signal F/R is set to "0", the direction switching device 107 outputs the inverted signal which is output from the arithmetic amplifier 105.

The comparator 15, which consists of resistors 75 and 77, compares an output signal S5 of the direction switching device 107 with an output signal S3 of the integration circuit 27 and sends a difference signal (position error signal) S4 to the window comparator 31 and the comparator 19.

The switch 17 selects one of output signals of the low pass filter 9 and the comparator 15 according to a command from the controller 11 and outputs the selected signal. The speed detector 25 detects the moving speed of a pick-up (not shown in the FIGURES) and outputs a speed signal S1. An arithmetic amplifier 33 amplifies the speed signal S1 and output a signal S2.

The comparator 19, which consists of registers 41 and 43, compares the signal S2 with an output of the comparator 15.

The amplifier circuit 21, which consists of an arithmetic amplifier 45, a register 47, and condensers 49 and 51, amplifies an output signal of the comparator 19. The condensers 51 and 53 and the resistors 47 and 55 are used to compensate the phase.

The motor 23 moves the pick-up according to an output signal of the amplifier circuit 21.

The integration circuit 27 integrates the speed signal S1 from the speed detector 25, obtains the output signal S3, and outputs it to the comparator 15. The integration circuit 27 consists of an arithmetic amplifier 57, transistors 59 and 61, resistors 63, 65, 67, and 69, and a condenser 71.

When the reset signal RST, which is sent from the controller, is set to "1", the transistor 59 is turned off and thereby the arithmetic amplifier 57 functions as an integration circuit. In contrast, when the reset signal RST is set to "0", the transistors 69 and 59 are turned on. Thus, since both the ends of the condenser 71 are shortcircuited, an output of the arithmetic amplifier 57 is "0" and thereby an initial value is set.

The window comparator 31 consists of comparators 85 and 87 and resistors 89, 91, 93, and 95. When the position error signal S4 is in a voltage range determined by the resistors 89, 91, 93, and 95, an output signal TAC is set to 1. When the position error signal S4 is out of such a range, the output signal TAC is set to "0".

A resistor 103 is a pull-up resistor. A diode 101 is a protection diode for preventing a negative voltage from being applied to the controller 11. A condenser 99 is a noise arrester condenser.

Then, by referring to FIG. 1, an outline of the operation of the track jump control circuit will be described in the following.

In track following state (position control state) where the pick-up is followed to a particular track so as to read information, the controller 11 causes the switch 1 to be closed and the switch 17 to be placed in the low pass filter 9 side. In this state, the tracking error signal ER and the output signal S1 of the speed detector 25 are input to the comparator 19. The comparator 19 compares these signals and sends the difference signal to the motor 23.

In track jump state (speed control state), the controller 11 causes the switch 1 to be opened and the switch 17 to be placed on the comparator 15 side. The controller 11 sends data equivalent to the distance over which the pick-up is moved to a desired position to the reference voltage generation circuit 13. The integration circuit 27 outputs the position signal of the pick-up. The comparator 15 compares these signals and sends the resultant signal to the motor 23 so as to move the pick-up to the desired position.

The completion state of the track jump is determined in the following manner.

Since the output signal of the comparator 15 is input to the window comparator 31 as shown in FIG. 2, when the output signal of the comparator 15 is in the voltage range determined by the resistors 89, 91, 93, and 95, the output signal of the window comparator 31 is set to "1". Thus, the controller 11 determines that the track jump operation was completed.

Then, by referring to FIGS. 2 and 3, the operation in the track jump state of the track jump control circuit will be described in detail.

Figure 3:
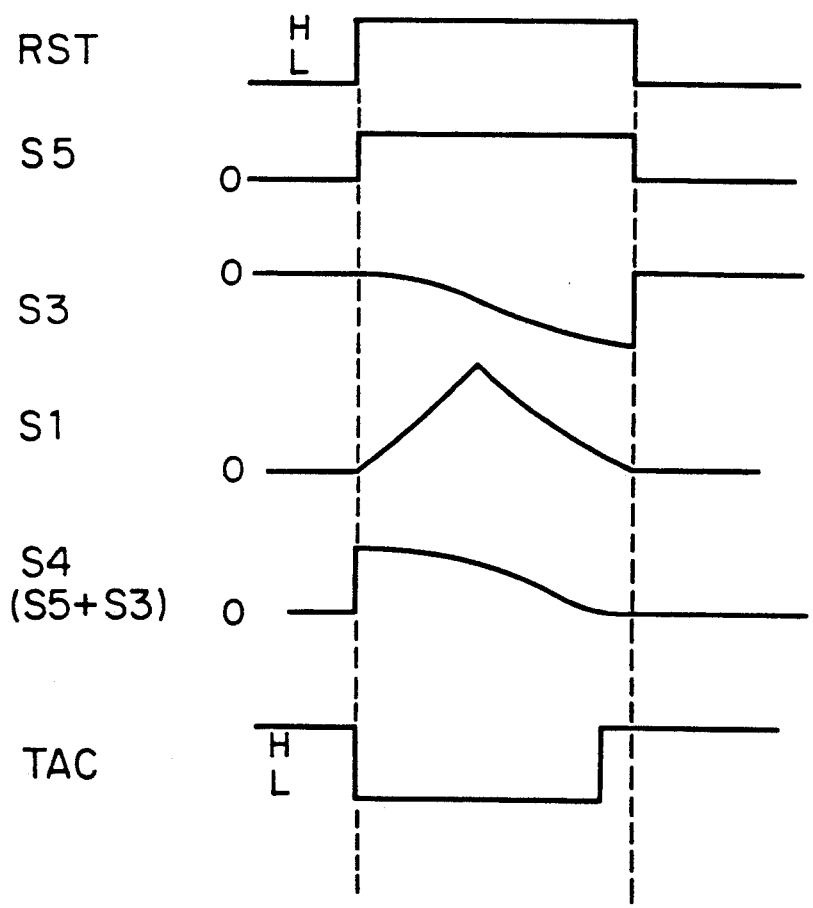
FIG. 3 is a wave form schematic of each signal of FIG. 2.

FIG. 3 is a wave form diagram of each signal of FIG. 2.

In the track jump state, the controller 11 determines the track jump direction and sets the signal F/R to "0" or "1". When the signal F/R is set to "1", the direction switching device 107 functions as a non-inverting amplifier whose gain is "1". In contrast, when the signal F/R is set to "0", the direction switching device 107 functions as an inverting amplifier whose gain is "−1".

Then, the controller 11 sets the reset signal RST to "1". At that time, the transistor 59 is turned off and the arithmetic amplifier 57 is in an integration state. At that time, since the output signal of the speed detector 25 does not take place, the signals S1, S2, and S3 are kept to "0".

Then, the controller 11 sends data equivalent to the difference between the present position and the desired position of the pick-up to the reference voltage generation circuit 13. The reference voltage generation circuit 13 converts the received signal into an analog signal. The direction switching device 107 multiplies the analog signal by 1 or −1 and outputs the resultant signal S5 to the comparator 15.

At that time, since both the signals S2 and S3 are set to "0", the signal S5 is input to the motor 23 as it is and thereby the pick-up is fully accelerated in the predetermined direction.

When the motor 23 is being started, a signal proportional to the speed is output from the speed detector 25.

When the motor 23 rotates, the output signal S3 of the integration circuit 27 is output in the negative direction.

The comparator 15 compares the signal S3 with the signal S5. The comparator 19 also compares the position error signal S4 with the signal S2. When the signal S4 is equal to the signal S2, the motor 23 is decelerated. The level of the signal output from the comparator 15 is reduced to zero as the pick-up reaches to the desired position as shown in FIG. 3.

When the pick-up is placed in the desired position, since S4=0 and S2=0, the motor 23 is stopped. At that time, the position error signal S4 is in the range determined by the window comparator 31 and the output signal TAC of the window comparator 31 is set to "1". Thus, the controller 11 detects that the track jump operation was completed. After a predetermined time elapsed, the controller 11 sets both the signal DATA and the reset signal RST to "0" so as to complete the track jump operation.

At that time, the controller 11 turns on the switch 1 and places the switch 17 in the low pass filter 9 side. Thus, the apparatus enters the track following mode.

In this embodiment, the position error signal S4 is input to the window comparator 31. When the position error signal S4 is in the predetermined range, the controller 11 determines that the track jump operation was completed.

As was described above, since the position error signal S4 is used to determine whether or not the track jump operation was completed, an effect of an external vibration against the apparatus can be reduced.

During the track jump state, since the position control loop is structured, the suppression degree against vibrations in low frequency range is high. In other words, the position error signal S4 is less affected by an external vibration frequency than the speed signal.

In addition, since the position error signal S4 is output just when a desired position is set, the response in the track jump initial state of the TAC signal can be improved.

Figure 4:
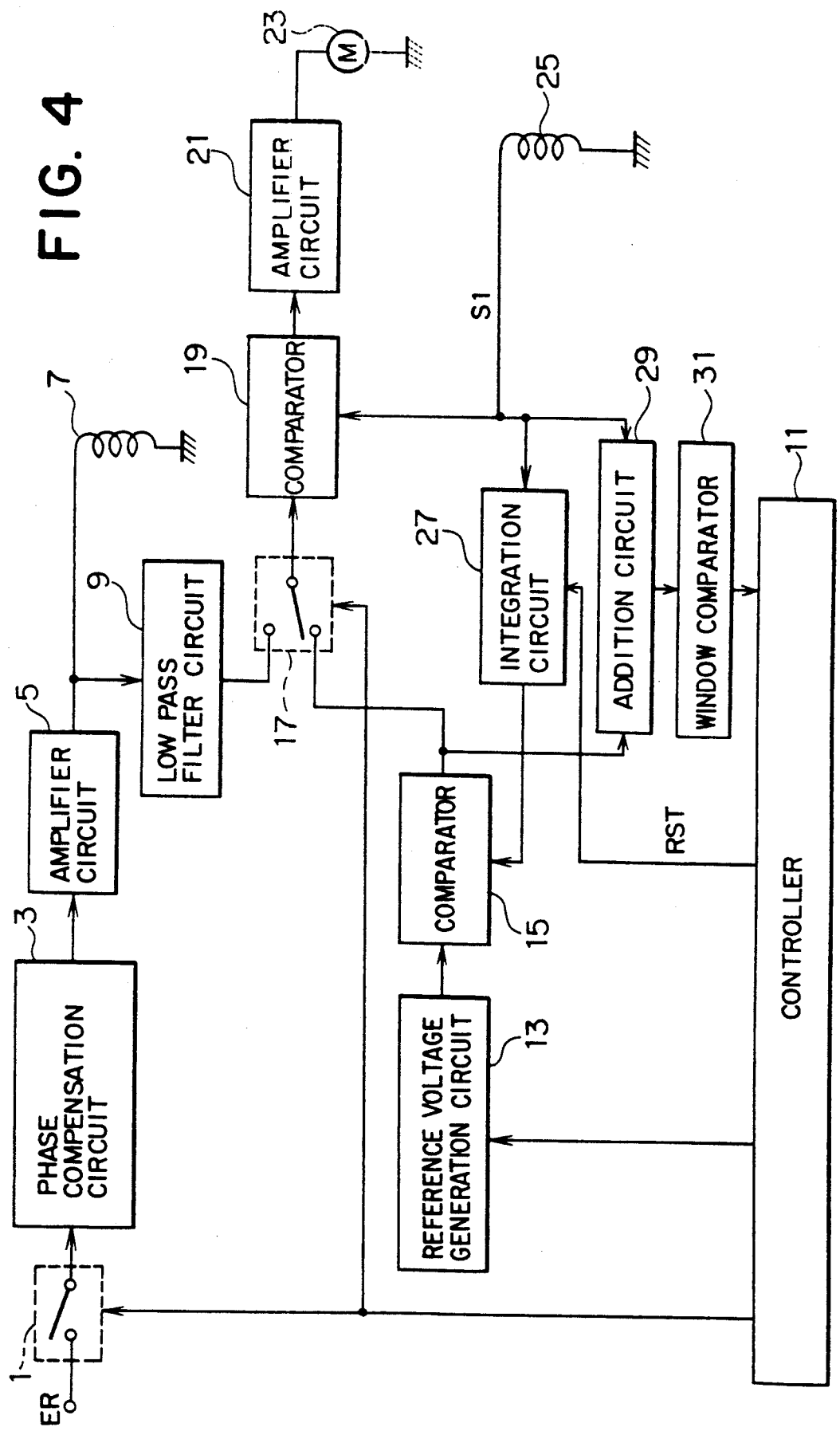
FIG. 4 is a block diagram showing the structure of a track jump control circuit of a second embodiment of the present invention.
Figure 5:
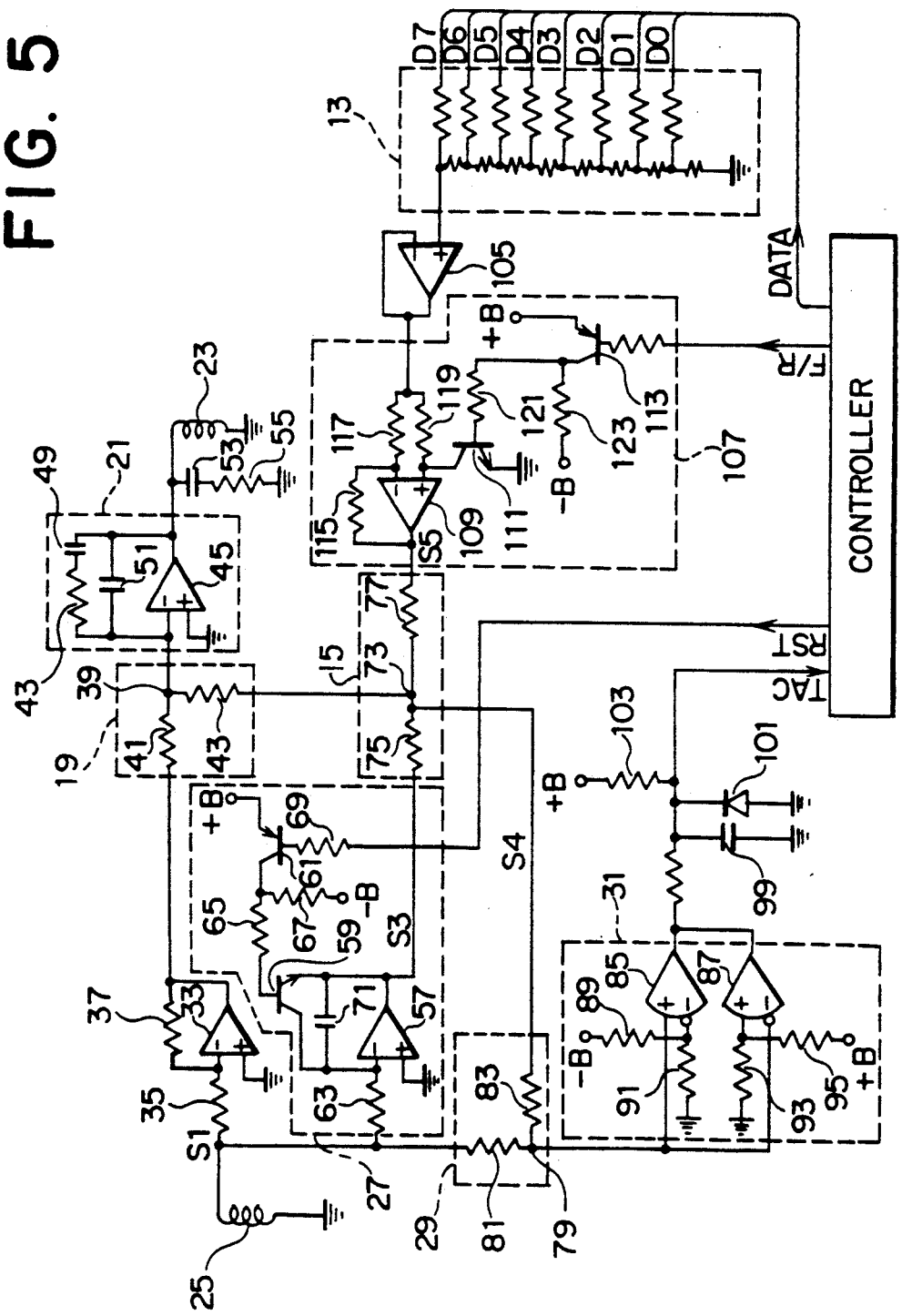
FIG. 5 is a circuit diagram showing the track jump control circuit of the second embodiment of the present invention.

Then, by referring to FIGS. 4 and 5, a second embodiment of the present invention will be described in the following. FIGS. 4 and 5 are a block diagram and a circuit diagram showing the structure of a track jump control circuit of the second embodiment of the present invention. The portions which are same as those in the first embodiment have the same numerals and the description thereof will be omitted.

In the second embodiment, an addition circuit 29 is used to add the position error signal S4 and the speed signal of the pick-up. The added signal is input to the wind comparator 31 so as to determine whether or not the track jump operation was completed. In this embodiment, the position error signal S4 is added to the speed signal of the pick-up in the ratio of 5 to 1.

According to the second embodiment, the controller 11 can monitor the speed state and the position error state by means of one wind comparator 31.

In the CD-ROM drive apparatus, CD player, or the like, when the power is turned on, information at the first position of the disc named TOC should be verified. However, since this information is recorded at the most inner peripheral position, the controller 11 moves the pick-up to the inner peripheral direction of the disc in a method other than the track jump method until the pick-up contacts the stopper.

At that time, even if no special switch is provided at the stopper portion, since the speed signal is monitored, the contact of the pick-up to the stopper can be readily detected.

In addition, the addition ratio of the position error signal S4 and the speed signal can be set in various manners according to applications.

Moreover, in the second embodiment, it is possible to provide a potentiometer for detecting the pick-up position instead of the integration circuit 27 so as to input an output signal of the potentiometer to the comparator 15.

It should be understood that the present invention can be applied to other record and playback apparatuses besides the optical record and playback apparatus.

What is claimed is:

1. A track jump control circuit, comprising:
   a pick-up for reading information stored on a disc;
   moving means for moving said pick-up in a radial direction of said disc;
   driving means for generating a driving signal and for driving said moving means according to said driving signal;
   speed detecting means for detecting a moving speed of said pick-up and for outputting a speed signal;
   moving amount computing means for generating a signal according to a moving amount of said pick-up according to said speed signal;
   means for generating a reference signal according to a distance over which said pick-up is moved in a track jump mode;
   comparing means for comparing said reference signal with said signal according to said moving amount and for sending a continuously variable difference signal to said driving means; and
   stopping means for stopping sending said difference signal to said driving means when said difference signal is in a first predetermined range.

2. The track jump control circuit as set forth in claim 1, wherein said moving amount computing means comprises an integration circuit for integrating said speed signal which is output from said speed detecting means.

3. The track jump control circuit as set forth in claim 1, wherein said speed detecting means and said moving amount computing means comprise a potentiometer.

4. The track jump control circuit as set forth in claim 1, wherein said stopping means includes:
   a window comparator for detecting whether said difference signal is in a second predetermined range;
   a controller for receiving an output signal of said window comparator; and
   a switch connected between said comparing means and said moving means;
   wherein said controller opens said switch when said window comparator detects that said difference signal is in said first predetermined range.

5. The track-jump control circuit as set forth in claim 1, wherein said comparing means includes means for sending a variable difference signal having a ramp-up portion and a ramp-down portion, such that a velocity of said moving means at said end of said track-jump is approximately zero.

6. A track jump control circuit, comprising:

a pick-up for reading information stored on a disc;

moving means for moving said pick-up in a radial direction of said disc;

driving means for generating a driving signal and for driving said moving means according to said driving signal;

speed detecting means for detecting a moving speed of said pick-up and for outputting a speed signal;

moving amount computing means for generating a signal according to a moving amount of said pick-up;

means for generating a reference signal according to a distance over which said pick-up is moved in at track jump mode;

comparing means for comparing said reference signal with said signal according to said moving amount and for sending a continuously variable difference signal to said driving means;

addition means for adding said difference signal to said speed signal; and stopping means for stopping sending said difference signal to said driving means when said difference signal is in a predetermined range.

7. The track jump control circuit as set forth in claim 6, wherein said moving amount computing means is an integration circuit for integrating said speed signal which is output from said speed detecting means.

8. The track jump control circuit as set forth in claim 6, wherein said speed detecting means and said moving amount means comprise a potentiometer.

9. The track jump control circuit as set forth in claim 6, wherein said addition means adds said difference signal and said speed signal, the addition ratio of the former being larger than that of the latter.

10. The track jump control circuit as set forth in claim 6, wherein said stopping means includes:

a window comparator for detecting whether an output signal of said addition means is in a predetermined range;

a controller for receiving an output signal of said window comparator; and a switch connected between said comparing means and said moving means;

wherein said controller opens said switch when said window comparator detects that said output signal of said addition means in said predetermined range.

11. A track jump control circuit, comprising:

a pick-up for reading information stored on a disc;

moving means for moving said pick-up in a radial direction of said disc;

driving means for generating a driving signal and for driving said moving means according to said driving signal;

speed detecting means for detecting a moving speed of said pick-up and for outputting a speed signal;

moving amount computing means for generating a signal according to a moving amount of said pick-up according to said speed signal;

means for generating at reference signal according to a distance over which said pick-up is moved in a track jump mode;

first comparing means for comparing said reference signal with said signal according to said moving amount and for sending a continuously variable difference signal to driving means;

stopping means for stopping sending said difference signal to said driving means at an end of a track-jump.

12. The track jump control circuit as set forth in claim 11, wherein said moving amount computing means comprises an integration circuit for integrating said speed signal which is output from said speed detecting means.

13. The track jump control circuit as set forth in claim 11, wherein said speed detecting means and said moving amount computing means comprise a potentiometer.

14. The track jump control circuit as set forth in claim 11, wherein said driving means comprises second comparing means for comparing said continuously variable difference signal sent from said first comparing means with said speed signal and for sending said driving signal to said moving means.

15. The track jump control circuit as set forth in claim 14, wherein said driving means comprises amplifying means for amplifying said driving signal.

16. The track jump control circuit as set forth in claim 14, wherein said moving amount computing means comprises an integration circuit for integrating said speed signal which is output from said speed detecting means.

17. The track jump control circuit as set forth in claim 14, wherein said speed detecting means and said moving amount computing means comprise a potentiometer.

18. A track jump control circuit, comprising:

a pick-up for reading information stored on a disc;

moving means for moving said pick-up in a radial direction of said disc;

driving means for generating a driving signal and for driving said moving means according to said driving signal;

speed detecting means for detecting a moving speed of said pick-up and for outputting a speed signal;

moving amount computing means for generating a signal according to a moving amount of said pick-up according to said speed signal;

means for generating a reference signal according to a distance over which said pick-up is moved in a track jump mode; and first comparing means for comparing said reference signal with said signal according to said moving amount and for sending a continuously variable difference signal to said driving means.

19. The track jump control circuit as set forth in claim 18, wherein said moving amount computing means comprises an integration circuit for integrating said speed signal which is output from said speed detecting means.

20. The track jump control circuit as set forth in claim 18, wherein said speed detecting means and said moving amount computing means comprise a potentiometer.

21. The track jump control circuit as set forth in claim 18, wherein said driving means comprises second comparing means for comparing said continuously variable difference signal sent from said first comparing means with said speed signal and for sending said driving signal to said moving means.

22. The track jump control circuit as set forth in claim 21, wherein said driving means comprises amplifying means for amplifying said driving signal.

23. The track jump control circuit as set forth in claim 18, wherein said first comparing means includes means for sending a variable difference signal having a ramp-up portion and a ramp-down portion, such that a velocity of said moving means at said end of said track-jump is approximately zero.

24. A track jump control circuit, comprising:

a pick-up for reading information stored on a disc;

moving means for moving said pick-up in a radial direction of said disc;

driving means for generating a driving signal and for driving said moving means according to said driving signal;

speed detecting means for detecting a moving speed of said pick-up and for outputting a speed signal;

moving amount computing means for generating a signal according to a moving amount of said pick-up according to said speed signal;

means for generating a reference signal according to a distance over which said pick-up is moved in a track jump mode;

comparing means for comparing said reference signal with said signal according to said moving amount and for sending a continuously variable difference signal to said driving means; and stopping means for stopping sending said difference signal to said driving means when said speed signal is in a predetermined range.

25. The track jump control circuit as set forth in claim 24, wherein said moving amount computing means comprises an integration circuit for integrating said speed signal which is output from said speed detecting means.

26. The track jump control circuit as set forth in claim 24, wherein said stopping means includes:

a window comparator for detecting whether said speed signal is in said predetermined range;

a controller for receiving an output signal of said window comparator; and a switch connected between said comparing means and said moving means;

wherein said controller opens said switch when said window comparator detects that said speed signal is in said predetermined range.

27. A track jump control circuit, comprising:

a pick-up for reading information stored on a disc;

moving means for moving said pick-up in a radial direction of said disc;

driving means for generating a driving signal and for driving said moving means according to said driving signal;

speed detecting means for detecting a moving speed of said pick-up and for outputting a speed signal;

moving amount computing means for generating a signal according to a moving amount of said pick-up;

means for generating a reference signal according to a distance over which said pick-up is moved in a track jump mode;

comparing means for comparing said reference signal with said signal according to said moving amount and for sending a continuously variable difference signal to said driving means;

addition means for adding said difference signal to said speed signal; and stopping means for stopping sending said difference signal to said driving means when an output signal of said addition means is in a predetermined range.

28. The track jump control circuit as set forth in claim 27, wherein said moving amount computing means comprises an integration circuit for integrating said speed signal which is output from said speed detecting means.

29. The track jump control circuit as set forth in claim 27, wherein said speed detecting means and said moving amount computing means comprise a potentiometer.

30. The track jump control circuit as set forth in claim 27, wherein said stopping means includes:

a window comparator for detecting whether an output signal of said addition means is in a predetermined range;

a controller for receiving an output signal of said window comparator; and a switch connected between said comparing means and said moving means;

wherein said controller opens said switch when said window comparator detects that said output signal of said addition means is in said predetermined range.

31. The track jump control circuit as set forth in claim 27, wherein said addition means adds said difference signal and said speed signal, the addition ratio of the former being larger than that of the latter.

* * * * *

UNITED STATES PATENT AND TRADEMARK OFFICE
CERTIFICATE OF CORRECTION

PATENT NO. : 5,285,432
DATED : February 8, 1994
INVENTOR(S) : Hiroshi NAKANE

It is certified that error appears in the above-indentified patent and that said Letters Patent is hereby corrected as shown below:

In column 3, line 44, change "output" to --outputs--;

line 45, change "registers" to --resistors--;

line 49, change "register" to --resistor--.

In column 5, lines 59 and 65, change "wind" to --window--.

Signed and Sealed this

Thirtieth Day of May, 1995

Attest:

BRUCE LEHMAN

*Attesting Officer*  *Commissioner of Patents and Trademarks*